United States Patent Office 2,857,389
Patented Oct. 21, 1958

2,857,389

STABILIZATION OF VINYL PYRIDINES

Anton M. Schnitzer, Dewey, and Robert E. Reusser, Bartlesville, Okla., assignors to Phillips Petroleum Company, a corporation of Delaware No Drawing. Application July 5, 1955
Serial No. 520,117

17 Claims. (Cl. 260—290)

This invention relates to the stabilization of vinyl-substituted heterocyclic compounds having a hetero nitrogen atom. In another aspect of the invention, it relates to the stabilization of vinylpyridine compounds.

In the manufacture of vinylpyridines and other vinyl-substituted heterocyclic nitrogen compounds, one of the principal difficulties encountered is the tendency for these vinyl compounds to polymerize at ambient temperatures. This tendency is especially pronounced when they are subjected to elevated temperatures. These vinyl compounds are used as monomers in polymerization reactions, and the presence of soluble and/or insoluble polymers in the vinylpyridine monomers can prevent their use for this purpose. The problem reaches its peak when such vinyl compounds are processed in the presence of heat, for example, in the distillation of these compounds. Polymers are also formed at ambient temperatures when the vinylpyridine compounds are stored and transported. It becomes important, therefore, to provide an effective stabilizing agent which will inhibit the formation of both soluble and insoluble polymers in the vinylpyridine monomers.

Vinylpyridine can be prepared by the dehydrogenation of a corresponding alkylpyridine by a method disclosed in the copending application of John E. Mahan, Serial No. 244,469, filed August 30, 1951, now Patent No. 2,769,811, for "The Preparation of 2-Methyl-5-Vinylpyridine from 2-Methyl-5-Ethylpyridine." The effluent from this dehydrogenation reaction is separated in a combined steam and vacuum fractional distillation, and this separation has been found to be very difficult, not only due to the proximity of the boiling points of the major components, but also due to the tendency of the 2-methyl-5-vinylpyridine to polymerize. The effluent is subjected to heat in the range of 180° to 220° F. during this steam and vacuum distillation, and operation of this distillation step can become extremely difficult because of the formation of polymers unless a suitable stabilizing agent is used.

The following are objects of the invention.

It is an object of this invention to provide a method for inhibiting the polymerization of vinyl-substituted heterocyclic nitrogen compounds having a hetero nitrogen atom.

Another object of the invention is to provide a method for inhibiting the formation of both soluble and insoluble polymers in vinyl-substituted heterocyclic compounds having a hetero nitrogen atom.

A further object of the invention is to provide a method for preventing polymerization of vinylpyridine under conditions of fractional distillation.

Other and further objects of the invention will become apparent to those skilled in the art upon consideration of the following disclosure.

We have discovered that the aforementioned objects are attained by adding to vinyl-substituted heterocyclic compounds having a hetero nitrogen atom a polymerization inhibiting amount of at least one of certain phenoxazine compounds. The phenoxazine compounds, and mixtures thereof, which are effective inhibitors in accordance with this invention include those represented by the following structural formulas:

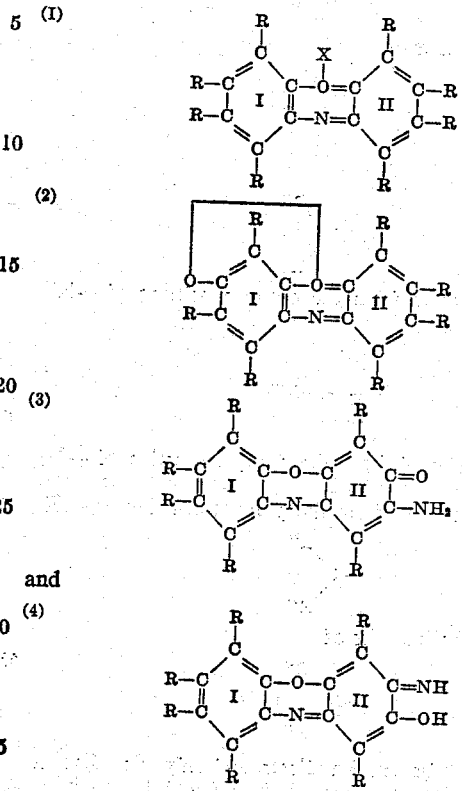

With reference to the above listed formulas, R can be hydrogen, a hydroxyl group, an —$ONH_4$ radical, a sulfonic acid group, a carboxyl group, an alkyl ester of a carboxyl group containing up to 6 carbon atoms, a halogen selected from the group consisting of chlorine, bromine and iodine, an amino group, or an amide group. If R is an amino group or an amide group, it may be an unsubstituted group or it may be mono- or di-substituted with an alkyl group containing up to 5 carbon atoms or with a phenyl group which itself may be mono-substituted with an amino group which latter group may be mono- or di-substituted wth alkyl groups containing up to 5 carbon atoms. R may also be present in the hydrogen halide salt form of any of the aforementioned amino groups. At least one of the R's is either a hydroxyl group or an amino group as described above, and furthermore at least three of the R's are hydrogen. X can be a halogen selected from the group consisting of chlorine, bromine, and iodine or an acid sulfate group. Additionally, any two adjacent R's, and only two adjacent R's, on at least one of rings I and II of the above formulas can be a

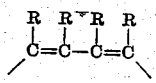

radical where R is as indicated hereinabove. In this regard, it is noted that the nucleus of the polycyclic radical formed by the addition of the

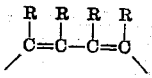

radical will not contain more than 10 carbon atoms.

The phenoxazine compounds to which this invention relates can also be defined as being selected from the group consisting of phenoxazines having structural formulas as indicated above where the R radical is selected from the group consisting of —H, —OH, —ONH₄, —SO₃H, —COOH, an alkyl ester of COOH containing up to 6 carbon atoms, —Cl, —Br, —I,

hydrogen halide salts of

and

where R' is selected from the group consisting of —R'' and

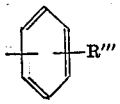

where R'' is selected from the group consisting of —H, —C$_n$H$_{(2n+1)}$ when $n$ is an integer from 1 to 5, inclusive, where R''' is selected from the group consisting of —H,

and hydrogen halide salts of

and where two adjacent R radicals, and only two adjacent R radicals, on at least one of rings I and II can be

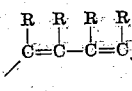

where R is as indicated above; at least one R radical being selected from the group consisting of —OH and

and at least 3 R radicals being —H; and where X is selected from the group consisting of —Cl, —Br, —I, and —SO₄H.

Specific working examples of phenoxazine compounds which can be used as inhibitors in accordance with this invention are 3-dimethylamino-7-diethylamino-8-methylphenoxazonium chloride (Brilliant Blue CC); 2-methyl-3-dimethylamino-7-aminophenoxazonium chloride (Brilliant Blue C); dimethylaminoanilinohydroxydiphenoxazonsulfonic acid-ammonium salt (Delphin Blue B); dimethylaminohydroxydiphenoxazoncarboxylic acid (Gallocyanin); 1-carbamyl-3,4-dihydroxy-7-dimethylaminophenoxazonium chloride (Gallamine Blue); 1-phenylcarbamyl-2-phenylamino-3,4-dihydroxy-7-dimethylaminophenoxazonium chloride (Gallanil Blue); 1,2-benzo-7-dimethylaminophenoxazonium chloride (Meldola Blue); 1,2-benzo-3-amino-7-diethylaminophenoxazonium sulfate (Nile Blue B); Asymmetrical-dihydroxydinaphthazoxonium sulfate (Alizarin Green); aminophenoxazon (2-amino-3H-isophenoxazin-3-one) and oxyphenoxazim (2-hydroxy-3H-isophenoxazin-3-imine).

Structural formulas and the naming system followed herein for these phenoxazine compounds can be found in "Encyclopedia of Chemical Technology," by Raymond E. Kirk and Donald F. Othmer, volume 2, pages 214–223, published by The Interscience Encyclopedia, Inc., New York (1948); in "Farbstofftabellen" von Gustav Schultz, siebente Auflage, neu bearbeitet and erweitert von Dr. Ludwig Lehmann, Leipzig, Akademische Verlagsgesellschaft m. b. H. (1931), lithographed by Edwards Brothers, Inc., Ann Arbor, Michigan (1945); and in Beilstein's Handbuch der Organischen Chemie, vierte Auflage.

As has been indicated above, the phenoxazine compounds of this invention are effective to inhibit the formation of both soluble and insoluble polymers in vinyl-substituted heterocyclic compounds having a hetero nitrogen atom. The insoluble polymer is also commonly known as "popcorn polymer" and is an insoluble, hard, porous and opaque material. Popcorn polymer is aptly named because it resembles "popcorn" in appearance.

We wish to point out that we intend that the terms "stabilizer", "inhibitor" or "inhibiting agent", used herein, shall have essentially the same meaning and that they are used for essentially the same purpose, which is to designate the substances disclosed herein which prevent polymerization of the vinyl-substituted heterocyclic nitrogen compounds. It is not intended that these terms necessarily shall denote a mechanism by which this stabilizing action is accomplished.

One group of polymerizable vinyl-substituted heterocyclic compounds containing a hetero nitrogen atom which can be stabilized in accordance with our invention is the mono- and divinylpyridines, with the vinyl radical being present in any of the several positions in the pyridine nucleus. Alkyl radicals can be present on the ring, or on the alpha carbon atom of the vinyl radical, but the number of carbon atoms in the combined alkyl radicals should generally not be greater than 12. These alkyl radicals are preferably methyl and ethyl radicals. Substituents attached to carbon atoms in the ring can be selected from the group consisting of hydrogen, alkyl, vinyl and isopropenyl (alpha-methylvinyl) radicals; at least one, and not more than two, of said radicals being vinyl or alpha-methylvinyl with the total number of carbon atoms in the alkyl radicals being not greater than 12. Examples of such compounds are 2-vinylpyridine, 3- vinylpyridine, 4-vinylpyridine, 2,5-divinylpyridine, 2-methyl-5-vinylpyridine, 2-vinyl-5-ethylpyridine, 2,3,4-trimethyl-5-vinylpyridine, 3,4,5,6-tetramethyl-2-vinylpyridine, 3-ethyl-5-vinylpyridine, 2,6-diethyl-4-vinylpyridine, 2-isopropyl-4-nonyl-5-vinylpyridine, 2-methyl-5-undecyl-4-vinylpyridine, 3-dodecyl-2,4-divinylpyridine, 2,3-dimethyl-5,6-dipentyl-4-vinylpyridine, 2-methyl-5-(alphamethylvinyl)pyridine, 2,5-di(alpha-methylvinyl)pyridine, and the like.

Other polymerizable heterocyclic compounds containing a hetero nitrogen atom included within the scope of this invention are those vinyl- and alpha-methylvinyl-substituted heterocyclic nitrogen compounds in which the ring structure is unsaturated, partially saturated and completely saturated. Examples include vinyl- and alpha-methylvinyl-substituted quinolines, isoquinolines, piperidines (hexahydropyridines), pyrroles, pyrrolidines, pyrrolidones, alkyl derivatives of the foregoing compounds, dihydro and tetrahydropyridines, partially hydrogenated quinolines and isoquinolines, and pyrrolines (dihydropyrroles). Examples of such compounds are 2-vinylquinoline, 8-ethyl-2-vinylquinoline, 4-hexyl-5-vinylquinoline, 1-vinylisoquinoline, 5-methyl-1-isopropenylisoquinoline, 1,8-vinylisoquinoline, vinylpyrrolidone, vinylpyrrole, vinyldivinylisoquinoline, vinylpyrrolidone, vinylpyrrole, vinylpiperidine and vinylpyrrolidine, and the like. Normally, the vinyl substituent will be attached to a ring carbon atom. However, in compounds wherein the ring nitrogen atom is a secondary nitrogen atom, the vinyl group can instead be attached to this ring nitrogen atom, for example, N-vinylcarbazole and N-vinylpyrrolidone. The process of this invention is particularly applicable to organic or hydrocarbon mixtures containing substantial proportions of a vinylpyridine compound, i. e., that amount which causes difficulties due to its polymerization, e. g., over 50 percent. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, and 5-amyl-2-vinylpyridine.

In carrying out the invention, solution of the stabilizing agent in the vinylpyridine, or other heterocyclic compound containing a hetero nitrogen atom to be stabilized, can be accomplished in any suitable manner, such as by agitating or stirring the mixture containing the stabilizing agent, or merely by allowing the mixture to stand. Ultimately, the decision as to what concentration of the stabilizing agent to use will depend on variable factors, such as the temperature and duration of time at a given temperature at which the heterocyclic compound containing a hetero nitrogen atom will be maintained when inhibition of polymer formation is desired, and economic considerations. In the practice of this invention, a range of concentration from about 0.01 percent to 5.0 percent, or more, by weight of the phenoxazine compounds disclosed herein will be employed, preferably from 0.1 percent to 1.0 percent, all percentages being based on the weight of the heterocyclic compound containing a hetero nitrogen atom to be stabilized. Furthermore, the amount will depend on which particular heterocyclic compound containing a hetero nitrogen atom is concerned.

A more comprehensive understanding of the invention may be obtained by reference to the following illustrative examples, which are not intended, however, to be unduly limitative of the invention.

EXAMPLE I

Several phenoxazine compounds within the scope of this invention were tested for their effectiveness as inhibitors of soluble polymer formation in 2-methyl-5-vinylpyridine. Samples of 2-methyl-5-vinylpyridine containing 5 weight percent water were placed in vials, and to each vial there was added a small piece of steel and the inhibitor to be tested. The pieces of steel were added to the vials in order to simulate steel vessels. The vials were then flushed with nitrogen and sealed tightly with screw-on tops. The vials were then placed in an oven and maintained at 185° F. for 16 hours, after which a weighed sample of the contents of each vial was evaporated under vacuum and over boiling water. The residue remaining, with allowance for the weight of inhibitor present, was considered to be soluble polymer. The results of these tests are given below in Table I.

Table I

| Inhibitor | Amount of Inhibitor (Weight percent) | Weight percent of Soluble Polymer (Average of Several Runs) |
|---|---|---|
| Mixture of Aminophenoxaxon and oxyphenoxazim [1] | 0.1 | 1.26 |
|  | 0.3 | .78 |
|  | 0.6 | .65 |
| Dimethylaminophenonaphtha zoxonium chloride (Meldola Blue) | 0.60 | 0.95 |
| Dimethylamino-oxy-diphenoxazoncarbonic acid (Gallocyanin) | 0.60 | 1.09 |
| Control | 0.0 | 25.00 |

[1] Prepared by the oxidation of o-aminophenol as described in Beilstein XIII, page 355.

The structural formulas of the compounds tested are as follows:

(1) Aminophenoxazon

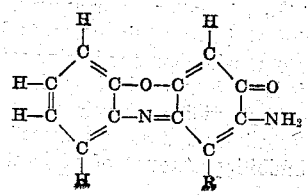

(2) Oxyphenoxyazim

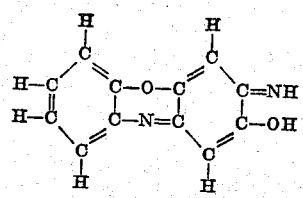

(3) Dimethylaminophenonapthazoxoniumchloride (Meldola Blue)

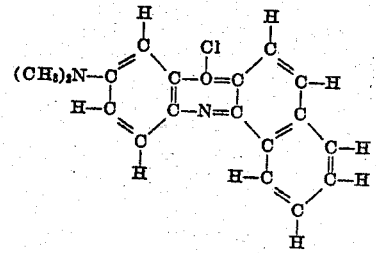

(4) Dimethylamino - oxy - diphenoxazoncarboxylic acid (Gallocyanin)

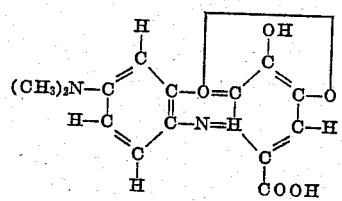

The data in Table I indicate that the phenoxazine compounds are very effective in preventing the formation of soluble polymer in a vinyl-substituted heterocyclic nitrogen compound. The results are noteworthy because of the elevated temperature to which the samples were exposed and also because of the very small amount of polymer which was formed under these conditions. The control was simply a sample of 2-methyl-5-vinylpyridine which was treated in the way described for the other tests except that no inhibitor was added.

EXAMPLE II

The phenoxazine compounds were also tested for their effectiveness as inhibitors of soluble polymer formation by the following method. Weighed samples of 2-methyl-5-vinylpyridine containing 5 weight percent water and an amount of inhibitors to be tested were distilled for 16 hours at 185° F. under conditions of total reflux. The pressure was adjusted to keep the temperature of the distillation at 185° F., and this pressure was calculated to be approximately 250 mm. of mercury. After distillation, the samples were evaporated under vacuum over boiling water. The residue, with allowance for weight of inhibitor present, was considered to be soluble polymer. The results of these tests are tabulated below in Table II. In these data, the percent of inhibitor used is expressed as a weight percent of the 2-methyl-5-vinylpyridine.

Table II

| Compound | Amount of Inhibitor (Weight percent) | Weight Percent of Soluble Polymer (Avg. of 2 runs) |
|---|---|---|
| Phenoxazine [1] | 0.3 | .89 |
|  | 0.3 | .97 |
| Control | 0.0 | 25.00 |

[1] Mixture of aminophenoxazon and oxyphenoxyazim prepared by the oxidation of o-aminophenol as described in Beilstein XIII, pp. 355.

The data in Table II shows that phenoxazine compounds are effective in distillation processes where the need for the inhibitors is of the greatest commercial importance. The control was a sample of 2-methyl-5-vinylpyridine which was subjected to the same conditions as samples containing an inhibitor except that no inhibitor was used.

EXAMPLE III

These phenoxazine compounds were further tested as polymerization inhibitors to determine their effectiveness under conditions of storage and/or transit of 2-methyl-5-vinylpyridine. In these tests, the vials, each containing a small piece of steel, were charged with flashed 2-methyl-5-vinylpyridine to which had been added 0.1 weight percent of the inhibitor. The small pieces of steel were added to the vials in order to simulate steel vessels. Thirty-five percent of the volume of each vial was left empty to provide an air cover for each sample and to thereby simulate conditions of storage and transit. The vials were sealed with screw caps and maintained at 100° F. during the test period. The results of these tests are given below in Table III.

Table III

| Inhibitor | Amount of Inhibitor Used (Weight percent) | Duration of Test, days | Amount of Soluble Polymer Formed (Weight percent) |
|---|---|---|---|
| Phenoxazine [1] | 0.1 | 21 | 0.00 |
| Meldola Blue | 0.1 | 21 | 0.00 |
| Gallocyanin | 0.1 | 21 | 0.00 |
| Control | (No inhibitor) | 21 | 22.25 |

[1] See footnote under Table II.

The data in Table III show that no soluble polymer was formed in the 2-methyl-5-vinylpyridine under the conditions of the test.

EXAMPLE IV

Tests were made in order to ascertain the effectiveness of phenoxazine compounds as inhibitors for popcorn polymer formation in 2-methyl-5-vinylpyridine. Samples of flashed 2-methyl-5-vinylpyridine were placed in vials, and to each sample there was added 0.3 weight percent divinylbenzene and the stated amount of inhibitor. Thirty-five percent of the volume of each vial was left empty to provide an air space. The control was prepared in the same way except that no inhibitor was added. The vials were sealed with screw caps and then placed in an oven maintained at 185° F., and the results of these tests are noted below in Table IV.

Table IV

| Inhibitor | Amount of Inhibitor Used (Weight percent) | Results |
|---|---|---|
| Phenoxazine [1] | 0.01 | No popcorn polymer in 34 days. |
| Phenoxazine [1] | 0.1 | Do. |
| Control | 0.0 | 100 percent popcorn polymer in eight hours. |

[1] See footnote under Table II.

The data in Table IV indicate that the phenoxazine compounds are very effective in preventing the formation of insoluble or popcorn polymer even when the sample of the vinyl-substituted heterocyclic nitrogen compound is maintained at elevated temperatures for extended periods of time.

EXAMPLE V

Tests were made to determine the effectiveness of the phenoxazine compounds as inhibitors during the vacuum distillation of 2-methyl-5-vinylpyridine (MVP) in a pilot plant column which was controlled so as to closely simulate commercial scale operations wherein the effluent from the dehydrogenation of 2-methyl-5-ethylpyridine is subjected to a steam and vacuum distillation. In these tests a column was used which was 2 inches in diameter and 4 feet high and packed with 3/8" stainless steel Helipack (No. 2918). This column was designed so that inhibited, water saturated MVP would be fed into the top of the column at a controlled rate of 100 ml. per hour. The column kettle was charged initially with 650 grams of MVP containing 5.0 weight percent water and inhibitor at the desired concentration. The feed mixture was flashed MVP with an added 15 weight percent of water and an inhibitor at a concentration of one-tenth of that used in the kettle. The column was operated so that the amount of distillate taken overhead was such that the inhibitor was concentrated by a factor of 10 as it progressed down the column, resulting in a constant concentration of inhibitor being maintained in the kettle. The kettle temperature was held at 185° F. at 225 mm. of mercury by controlling the amount of water added to the column kettle. Samples were taken from the kettle after a ten-hour interval and analyzed for polymer by vacuum distillation over boiling water. The data obtained using phenoxazine compounds and sulfur as inhibitors are given below in Table V.

Table V

| Run No. | Inhibitor | Amount of Inhibitor (Weight Percent) | Weight Percent Polymer | | |
|---|---|---|---|---|---|
| | | | Sample A | Sample B | Average |
| A | Sulfur | 0.3 | 1.27 | 1.29 | 1.28 |
| B | Phenoxazine [1] | 0.3 | 0.47 | 0.43 | 0.45 |

[1] See footnote under Table II.

The data in Table V indicate that phenoxazine compounds are very effective in preventing polymer formation in a steam and vacuum distillation of a mixture of vinylpyridines such as is produced by the dehydrogenation of 2-methyl-5-ethylpyridine to produce 2-methyl-5-vinylpyridine.

When the phenoxazine compounds are used as inhibitors in the distillation of the effluent from the dehydrogenation of 2-methyl-5-ethylpyridine to produce 2-methyl-5-vinylpyridine, the inhibitors can be added to the feed to the distillation column, any point along the column or the inhibitor can be added to the reflux of the distillation column. It will be found that in some cases, a smaller amount of the inhibitor is effective when the inhibitor is added to the top of the column or to the column reflux.

It will be understood that the foregoing disclosure is illustrative of our invention and that other embodiments within the scope of the invention will occur to those skilled in the art. Those skilled in the art will appreciate, for instance, that for the purpose of this invention, vinyl-substituted heterocyclic compounds having a hetero nitrogen atom further substituted with non-interfering groups, for example, halo-, nitro-, amino-, hydroxyl-, and carboxyl-, are the same as non-substituted vinyl heterocyclic compounds having a hetero nitrogen atom.

We claim:
1. A composition of matter comprising a polymerizable vinyl-substituted heterocyclic compound having a hetero nitrogen atom, said compound being selected from the group consisting of monovinylpyridine and alkyl-substituted monovinylpyridine wherein the total carbon atoms in alkyl substituents does not exceed 12, and a polymerization inhibiting amount of at least one poly- merization inhibitor selected from the group of phenoxazines having the following structural formulas:

(1) 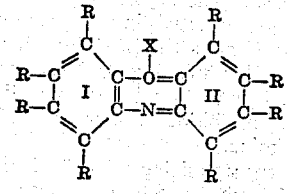

(2) 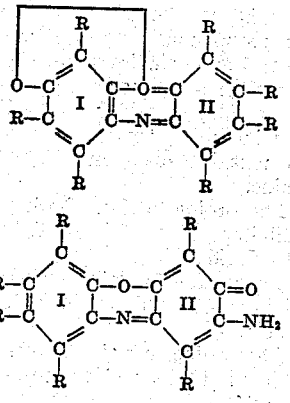

(3) 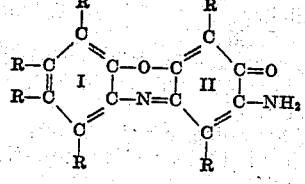

and (4) 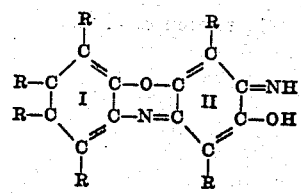

where R is selected from the group consisting of —H, —OH, —COOH, and

where R' is selected from the group consisting of —H and —C$_n$H$_{(2n+1)}$, n being an integer from 1 to 5, inclusive, and where two adjacent R radicals, and only two adjacent R radicals, on at least one of rings I and II can be

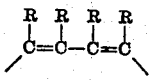

where R is as indicated above; at least one R radical being selected from the group consisting of —OH and

and at least three R radicals being —H; and where X is selected from the group consisting of —Cl, —Br, and —I.

2. A composition of matter comprising a polymerizable vinyl-substituted heterocyclic compound having a heteronitrogen atom, said compound being selected from the group consisting of monovinylpyridine, and alkyl-substituted monovinylpyridine wherein the total carbon atoms in the alkyl substituents does not exceed 12, and a polymerization inhibiting amount of 2-amino-3H-isophenoxazin-3-one.

3. A composition of matter comprising a polymerizable vinyl-substituted heterocyclic compound having a hetero nitrogen atom, said compound being selected from the group consisting of monovinylpyridine, and alkyl-substituted monovinylpyridine wherein the total carbon atoms in the alkyl substituents does not exceed 12, and a polymerization inhibiting amount of 2-hydroxy-3H-isophenoxazim-3-imine.

4. A composition of matter comprising a polymerizable vinyl-substituted heterocyclic compound having a hetero nitrogen atom, said compound being selected from the group consisting of monovinylpyridine, and alkyl-substituted monovinylpyridine wherein the total carbon atoms in the alkyl substituents does not exceed 12, and a polymerization inhibiting amount of a mixture of 2-amino-3H-isophenoxazin-3-one and 2-hydroxy-3H-isophenoxazin-3-imine.

5. A composition of matter according to claim 1 wherein said polymerization inhibitor is 1,2-benzo-7-dimethylaminophenoxazonium chloride.

6. A composition of matter according to claim 1 wherein said polymerization inhibitor is dimethylaminohydroxydiphenoxazoncarboxylic acid.

7. A composition of matter according to claim 1 wherein said polymerization inhibitor is 1,2-benzo-3-amino-7-diethylaminophenoxazonium sulfate.

8. A method for stabilizing a vinyl-substituted heterocyclic compound having a hetero nitrogen atom against polymerization said heterocyclic compound being selected from the group consisting of monovinylpyridine and alkyl-substituted monovinylpyridine wherein the total carbon atoms in alkyl substituents does not exceed 12, which comprises adding to said heterocyclic compound a polymerization inhibiting amount of at least one polymerization inhibitor selected from the group consisting of phenoxazines having the following structural formulas:

(1) 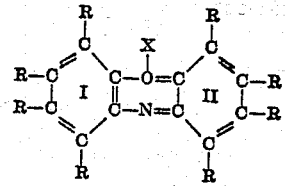

(2) 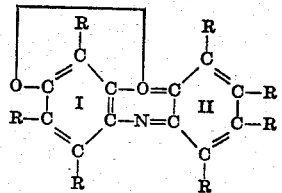

(3) 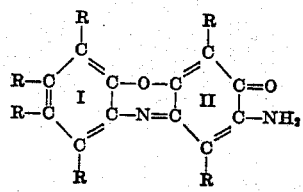

and (4) 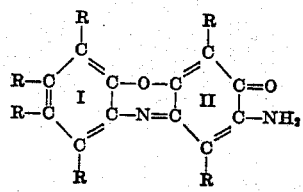

where R is selected from the group consisting of —H, —OH, —COOH and

where R' is selected from the group consisting of —H and —C$_n$H$_{(2n+1)}$, n being an integer from 1 to 5, inclusive, and where two adjacent R radicals, and only two adjacent R radicals, on at least one of rings I and II can be

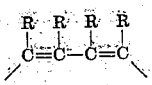

where R is as indicated above; at least one R radical being selected from the group consisting of —OH and

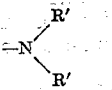

and at least three R radicals being —H; and where X is selected from the group consisting of —Cl, —Br, and —I.

9. A method according to claim 8 wherein said heterocyclic compound is a vinyl-substituted pyridine.

10. A method according to claim 8 wherein said heterocyclic compound is 2-methyl-5-vinylpyridine.

11. A method according to claim 8 wherein the amount of said polymerization inhibitor is from 0.01 to 5.0 weight percent, based on the weight of said heterocyclic compound.

12. A method for stabilizing a vinyl-substituted heterocyclic compound having a hetero nitrogen atom against polymerization, said heterocyclic compound being selected from the group consisting of monovinylpyridine and alkyl-substituted monovinylpyridine wherein the total carbon atoms in alkyl substituents does not exceed 12, which comprises adding to said heterocyclic compound a polymerization inhibiting amount of 2-amino-3H-isophenoxazin-3-one.

13. A method for stabilizing a vinyl-substituted heterocyclic compound having a hetero nitrogen atom against polymerization, said heterocyclic compound being selected from the group consisting of monovinylpyridine and alkyl-substituted monovinylpyridine wherein the total carbon atoms in alkyl substituents does not exceed 12, which comprises adding to said heterocyclic compound a polymerization inhibiting amount of 2-hydroxy-3H-isophenoxazin-3-imine.

14. A method for stabilizing a vinyl-substituted heterocyclic compound having a hetero nitrogen atom against polymerization, said heterocyclic compound being selected from the group consisting of monovinylpyridine and alkyl-substituted monovinylpyridine wherein the total carbon atoms in alkyl substituents does not exceed 12, which comprises adding to said heterocyclic compound a polymerization inhibiting amount of a mixture of 2-amino-3H-isophenoxazin-3-one and 2-hydroxy-3H-isophenoxazin-3-imine.

15. A method according to claim 8 wherein said polymerization inhibitor is 1,2-benzo-7-dimethylaminophenoxozonium chloride.

16. A method according to claim 8 wherein said polymerization inhibitor is dimethylaminohydroxydiphenoxazoncarboxylic acid.

17. A method according to claim 8 wherein said polymerization inhibitor is 1,2-benzo-7-amino-7-diethylaminophenoxazonium sulfate.

No references cited.